(12) United States Patent
Fujii et al.

(10) Patent No.: US 10,471,801 B2
(45) Date of Patent: Nov. 12, 2019

(54) AIR-CONDITIONING DEVICE FOR VEHICLE SEAT

(71) Applicant: DENSO CORPORATION, Kariya, Aichi-pref. (JP)

(72) Inventors: Takahisa Fujii, Kariya (JP); Yasuhiko Niimi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 43 days.

(21) Appl. No.: 14/904,288

(22) PCT Filed: Jul. 14, 2014

(86) PCT No.: PCT/JP2014/003714
§ 371 (c)(1),
(2) Date: Jan. 11, 2016

(87) PCT Pub. No.: WO2015/008474
PCT Pub. Date: Jan. 22, 2015

(65) Prior Publication Data
US 2016/0144686 A1 May 26, 2016

(30) Foreign Application Priority Data

Jul. 17, 2013 (JP) .................................. 2013-148445
Jun. 3, 2014 (JP) .................................. 2014-114828

(51) Int. Cl.
*B60H 1/00* (2006.01)
*B60N 2/56* (2006.01)
*B60N 2/06* (2006.01)

(52) U.S. Cl.
CPC ............ *B60H 1/00285* (2013.01); *B60N 2/06* (2013.01); *B60N 2/5628* (2013.01); *B60N 2/5657* (2013.01); *B60H 2001/003* (2013.01)

(58) Field of Classification Search
CPC .......... B60H 1/00285; B60H 2001/003; B60N 2/06; B60N 2/5628; B60N 2/5657
(Continued)

(56) References Cited

U.S. PATENT DOCUMENTS 6,059,018 A 5/2000 Yoshinori et al.
2011/0226461 A1* 9/2011 Fujii .................. B60H 1/00285
165/200

FOREIGN PATENT DOCUMENTS

EP 1493600 A1 1/2005
JP H02049610 U 4/1990
(Continued)

OTHER PUBLICATIONS

Maruta et al, JP2000052747, "Vehicle seat with temperature adjusting mechanism", Aug. 1998.*
(Continued)

*Primary Examiner* — Vivek K Shirsat
*Assistant Examiner* — Ryan L Faulkner
(74) *Attorney, Agent, or Firm* — Harness, Dickey & Pierce, P.L.C.

(57) ABSTRACT

An air-conditioning device for a vehicle seat has a seat, an air conditioning duct, a floor-side connection part, a seat-side connection part, and a connection duct. A position of the seat is adjusted in a front-rear direction. The air conditioning duct guides air, which is supplied from an interior air-conditioning unit, to a lower side of the seat. The floor-side connection part is provided in a vehicle-compartment floor on the lower side of the seat and connects to a downstream side of the air conditioning duct in an air flow direction. The seat-side connection part is provided in a seat bottom surface. The connection duct has one end portion connecting to the floor-side connection part and an other end portion connecting to the seat-side connection part. The seat-side
(Continued)

connection part transfers across the floor-side connection part in the front-rear direction when a position of the seat is adjusted in the front-rear direction. The connection duct is deformable and stretchable. The floor-side connection part and the seat-side connection part are arranged at different positions in a left-right direction when viewed from a front side of a vehicle.

14 Claims, 7 Drawing Sheets

(58) Field of Classification Search
USPC .......................................................... 454/120
See application file for complete search history.

(56) References Cited

FOREIGN PATENT DOCUMENTS

| JP | H11078484 A | 3/1999 | |
| JP | 2000052747 A | 2/2000 | |
| JP | 2007308045 A | 11/2007 | |
| JP | 2010000846 A | 1/2010 | |
| JP | 2011194908 A | 10/2011 | |
| JP | 2011251573 | * 12/2011 | ............... B60H 1/00 |
| WO | WO-2007135863 A1 | 11/2007 | |

OTHER PUBLICATIONS

Maruta et al, JP2000052747 translation, "Vehicle seat with temperature adjusting mechanism", Aug. 1998.*
Nagasawa et al, JP2011251573, "Vehicular seat air conditioning device", Dec. 2011.*
Nagasawa et al, JP2011251573 translation, "Vehicular seat air conditioning device", Dec. 2011.*
Aoki et al, JP2007308045 translation, "Air conditioning device for seat", May 2006.*
Aoki, Norie, JP2007308045 Translation.pdf, "Air conditioning device for seat", Nov. 2007, pp. 1-10.*
International Search Report and Written Opinion (in Japanese with English Translation) for PCT/JP2014/003714, dated Oct. 14, 2014; ISA/JP.

* cited by examiner

AIR-CONDITIONING DEVICE FOR VEHICLE SEAT

CROSS REFERENCE TO RELATED APPLICATIONS

This application is a U.S. National Phase Application under 35 U.S.C. 371 of International Application No. PCT/JP2014/003714 filed on Jul. 14, 2014 and published in Japanese as WO 2015/008474 A1 on Jan. 22, 2015. This application is based on and claims the benefit of priority from Japanese Patent Application No. 2013-148445 filed on Jul. 17, 2013 and Japanese Patent Application No. 2014-114828 filed on Jun. 3, 2014. The entire disclosures of all of the above applications are incorporated herein by reference.

TECHNICAL FIELD

The present disclosure relates to an air-conditioning device for a vehicle seat that blows air from the vehicle seat.

BACKGROUND ART

A conventional air-conditioning device for a vehicle seat has a seat, a seat air-conditioning duct, a floor-side connection part, a seat-side connection part, and a connection duct. A position of the seat is adjusted in a front-rear direction of a vehicle. The seat air-conditioning duct guides air that is supplied from an interior air-conditioning unit to a lower side of the seat. The floor-side connection part is disposed on the lower side of the seat that is under an interior floor and connects to the seat air-conditioning duct. The seat connection part is disposed on a seat bottom surface of the seat and connects to an air passage in the seat. The connection duct makes the floor-side connection part and the seat-side connection part communicate with each other. By blowing air to a passenger from an outlet that is provided on a seat surface, the seat air-conditioning duct can rapidly makes the passenger feel comfortable (for example, refer Patent Literature 1).

PRIOR ART LITERATURES

Patent Literature

Patent Literature 1: JP 2007-308045 A

SUMMARY OF INVENTION

However, according to studies conducted by inventors of the present disclosure, a range in which the seat is adjustable in the front-rear direction is large. Furthermore, a space under the seat in which the connection duct is disposed has a quite small height dimension. Accordingly, the connection duct is required to have a length with which the connection duct is able to follow a movement of the seat in the front-rear direction and to have a low height dimension.

The seat-side connection part and the floor-side connection part are arranged, and the connection duct is configured to be deformable and stretchable such that the seat-side connection part transfers across the floor-side connection part when the seat is moved in the front-rear direction. Therefore, as compared to a case where the seat-side connection part does not transfer across the floor-side connection part, a length of the connection duct when being extended most by moving the seat in the front-rear direction can be shortened, and the connection duct can follow a movement of the seat.

However, in a case where the seat-side connection part and the floor-side connection part are arranged to be coincident with each other in a left-right direction of the vehicle, the seat-side connection part may be located immediately above the floor-side connection part when the seat is moved in the front-rear direction. The height dimension of the connection duct becomes minimum (i.e., a shortest length) when the connection duct shrinks most. Thus, when the shortest length of the connection duct is larger than the height dimension of the space under the seat, there may be a possibility that the connection duct may not be able to be housed in the space under the seat.

Such a condition that the connection duct cannot be housed in the space under the seat is not limited to be caused when the seat-side connection part and the floor-side connection part are arranged such that the seat-side connection part transfers across the floor-side connection part. For example, there may be the above-described possibility in a case where the seat-side connection part and the floor-side connection part are arranged such that the seat-side connection part and the floor-side connection part are coincident with each other in an upper-lower direction of the vehicle when the seat is moved in the front-rear direction of the vehicle.

The present disclosure addresses at least one of the above issues. Thus, it is an objective of the present disclosure to provide an air-conditioning device for a vehicle seat in which a connection duct can be housed in a limited space under a seat.

To achieve the above-described objective, an air-conditioning device for a vehicle seat of the present disclosure has a seat, an air conditioning duct, a floor-side connection part, a seat-side connection part, and a connection duct.

An air passage is formed in the seat, and a position of the seat is adjustable in a front-rear direction of the vehicle. The air conditioning duct is connected to an interior air conditioning unit that air-conditions an interior space of a vehicle compartment. The air conditioning duct guides air, which is supplied from the interior air conditioning unit, to a lower side of the seat. The floor-side connection part is provided in a vehicle-compartment floor on the lower side of the seat and connects to a downstream side of the air conditioning duct in an air flow direction. The seat-side connection part is provided in a seat bottom surface of the seat and connects to the air passage. The connection duct guides air flowing in the air conditioning duct to the air passage through both the floor-side connection part and the seat-side connection part.

The connection duct is deformable and stretchable. The floor-side connection part and the seat-side connection part are arranged to avoid overlapping with each other in an upper-lower direction of the vehicle when the seat is moved in the front-rear direction.

According to such a configuration, the seat-side connection part is not located immediately above the floor-side connection part when the seat is moved in the front-rear direction of the vehicle. In this case, the connection duct consistently inclines with respect to a vertical direction regardless of a position of the seat in the front-rear direction of the vehicle.

There may be a possibility that a length of the connection duct on a condition of shrinking most becomes longer than a height dimension of a space under the seat. In this case, the height dimension of the connection duct on a condition of being disposed in the space under the seat can be smaller by making the connection duct consistently incline with respect to the vertical direction regardless of a position of the seat in the front-rear direction of the vehicle as the present disclosure. Thus, according to the present disclosure, the connection duct can be housed in a limited space under the seat.

DESCRIPTION OF EMBODIMENTS

Figure 1:
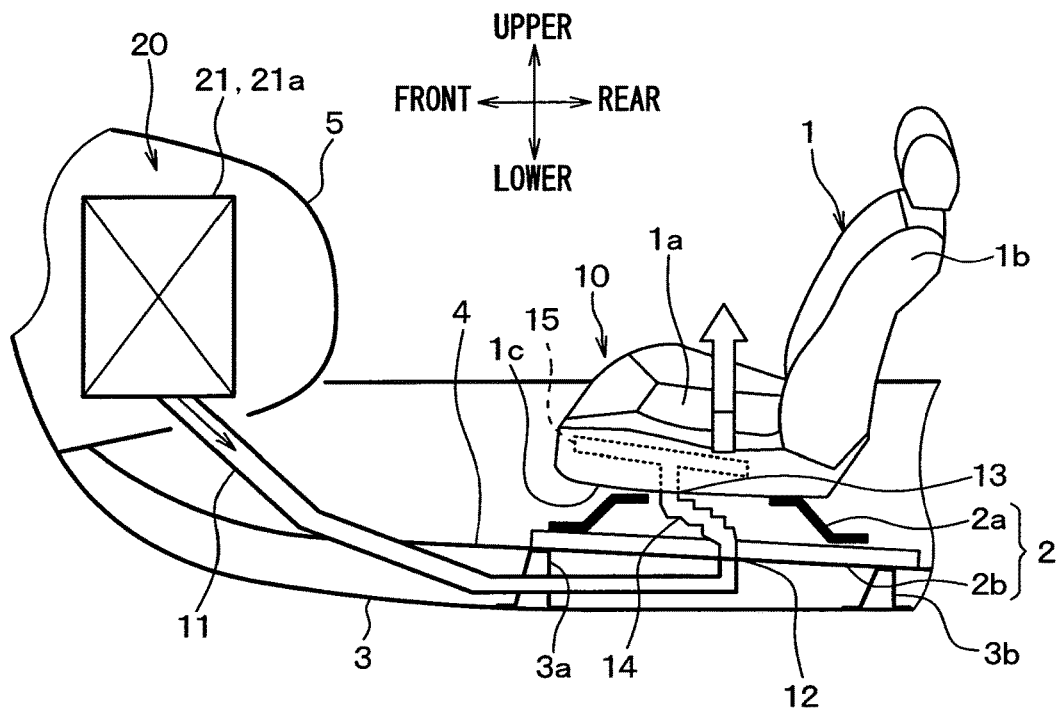
FIG. 1 is a schematic diagram illustrating an air-conditioning device for a vehicle seat of a first embodiment.

Embodiments of the present disclosure will be described hereafter referring to drawings. In the embodiments, a part that corresponds to or equivalents to a matter described in a preceding embodiment may be assigned with the same reference number. Arrows showing upper-lower, front-rear, and left-right in the drawing respectively indicates an upper-lower direction, a front-rear direction, and a left-right direction of a vehicle.

First Embodiment

In the present embodiment, as shown in FIG. 1, an air-conditioning device for a vehicle seat of the present disclosure is applied to a seat 1 for a front seat that is a driver seat or a passenger seat. An air-conditioning device 10 for a vehicle seat blows air, which is supplied from an air conditioner 20 for a vehicle that air-conditions an interior space of a vehicle compartment, from a surface of the seat 1. Specifically, the air-conditioning device 10 for a vehicle seat has a seat 1, an air conditioning duct (i.e., a seat air-conditioning duct) 11, a floor-side connection part 12, a seat-side connection part 13, and a connection duct 14.

The seat 1 therein has an air passage 15. Specifically, the seat 1 has a bottom part 1a and a back part 1b. The bottom part 1a mainly has a seat pad (not shown) and a surface portion (not shown) covering the seat pad. The air passage 15 is formed in the seat pad and the surface portion. A sectional area of the air passage 15 is smaller in the surface portion than in the seat pad. Accordingly, a pressure loss of air passing therethrough is higher in the surface portion than in the seat pad. A seat-side connection part 13 that connects to the air passage 15 is provided in a seat bottom surface 1c, that is, a lower surface of the bottom part 1a. The seat-side connection part 13 configures an inlet of the air passage 15.

The seat 1 is fixed to a vehicle-body floor 3 through a seat rail 2. The seat rail 2 is used to adjust a position of the seat 1 in the front-rear direction (i.e., the front-rear direction of the vehicle). The seat rail 2 is disposed in both end portions of the seat bottom surface 1c in the left-right direction (i.e., the left-right direction of the vehicle). The seat rail 2 has an upper rail 2a and a lower rail 2b. The upper rail 2a is fixed to the seat bottom surface 1c. The lower rail 2b is fixed to crosses 3a, 3b that are disposed in the vehicle-body floor 3. The crosses 3a, 3b are a fixed member supporting the seat rail 2. The upper rail 2a is slidable in the front-rear direction with respect to the lower rail 2b. Accordingly, as shown in FIG. 2, a position of the seat 1 in the front-rear direction can be adjusted.

In the present embodiment, a position of the seat 1 in the upper-lower direction also can be adjusted by a vertical adjuster mechanism that is not shown. The crosses 3a, 3b lift a vehicle-compartment floor 4. That is, the vehicle-compartment floor 4 is formed on a position of an upper surface of the crosses 3a, 3b by disposing a carpet on the upper surface of the crosses 3a, 3b. The carpet partitions the interior space of the vehicle compartment and thereby configures the vehicle-compartment floor 4. The vehicle-body floor 3 is a floor configured by a vehicle body, and the vehicle-compartment floor 4 is a floor that actually faces the interior space of the vehicle compartment.

Figure 2:
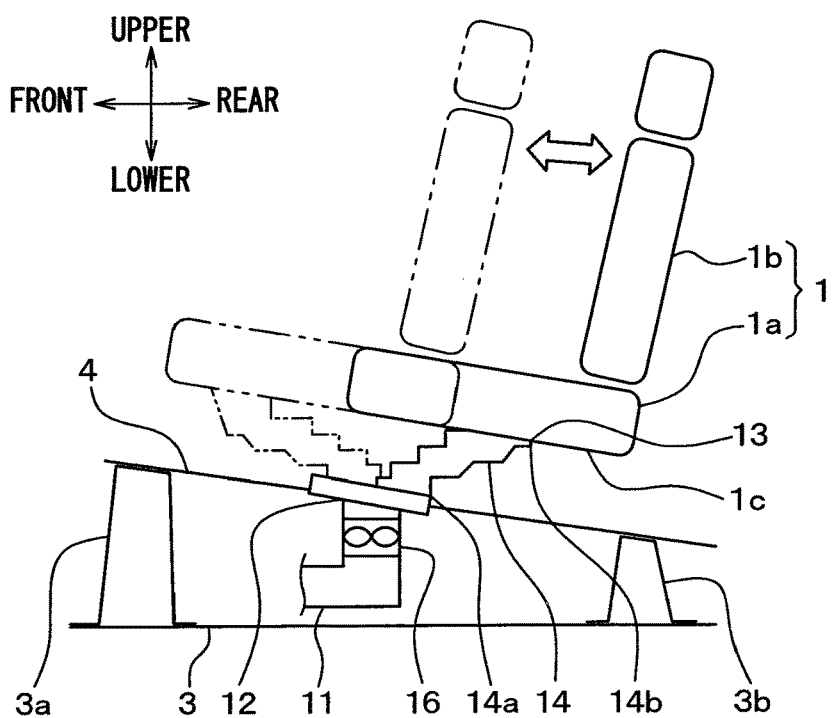
FIG. 2 is a lateral diagram illustrating a seat.

The seat-side connection part 13 is located between a front cross 3a and a rear cross 3b both on a condition where the seat 1 is located at a foremost position shown by a two-dot line in FIG. 2 and a condition where the seat 1 is located at a rearmost position shown by a solid line in FIG. 2.

The air conditioning duct 11 guides air, which is supplied from an interior air-conditioning unit 21 of the air conditioner 20 for a vehicle, to a lower side of the seat 1. The interior air-conditioning unit 21 is arranged inside of an instrument panel 5 that is located at a foremost part in the vehicle compartment. The interior air-conditioning unit 21 has an air conditioning case 21a, and the air conditioning case 21a therein houses a blower (not shown) and various air conditioning devices (not shown) such as an evaporator and a heater core of a refrigerant cycle. Air that is conditioned to a required temperature in the interior air-conditioning unit 21 is blown into the vehicle compartment from an outlet and a duct that are not shown and connected to the air conditioning case 21a.

The air conditioning duct 11 connects to a downstream side of the air conditioning case 21a in an air flow direction. The air conditioning duct 11 extends downward from the air conditioning case 21a to the vehicle-body floor 3 and then extends toward a rear side in the vehicle compartment along the vehicle-body floor 3. More specifically, a portion of the air conditioning duct 11 extending along the vehicle-body floor 3 is arranged between the vehicle-body floor 3 and the vehicle-compartment floor 4.

The air conditioning duct 11 has a downstream end that connects to the floor-side connection part 12 through the blower 16 as shown in FIG. 2. The floor-side connection part 12 is provided in the vehicle-compartment floor 4 under the seat 1. The floor-side connection part 12 is a connection part to which the connection duct 14 connects.

The blower 16 is arranged between the vehicle-body floor 3 and the vehicle-compartment floor 4. The blower 16 has a blower fan that causes an air flow, a motor (not shown) that drives the blower fan rotatably, and a casing (not shown) that houses the blower fan. A downstream end portion of the air conditioning duct 11 connects to an air suction port of the casing. An air outlet of the casing connects to the floor-side connection part 12. The air outlet of the casing may double as the floor-side connection part.

The blower 16 is controlled by a controller that is not shown. Operation signals from a blower operation switch that is provided in an air-conditioning operation panel (not shown) are input to the controller. On and off of the blower 16 and a blowing air volume of the blower 16 can be set by the blower operation switch. The air-conditioning operation panel also has various operation switches for the air conditioner 20 for a vehicle.

The connection duct 14 makes the air passage 15 in the seat 1 and the air conditioning duct 11 communicate with each other. As shown in FIG. 2, the connection duct 14 is arranged between the seat bottom surface 1c and the vehicle-compartment floor 4. The connection duct 14 has one end portion 14a connecting to the floor-side connection part 12 and the other end portion 14b connecting to the seat-side connection part 13. The connection duct 14 is made of synthetic resin having flexibility to have a bellows shape and is deformable and stretchable. Accordingly, the connection duct 14 can connect the floor-side connection part 12 and the seat-side connection part 13 straight regardless of a position of the seat 1 in a range in which a position of the seat 1 is adjusted in the front-rear direction.

Figure 3:
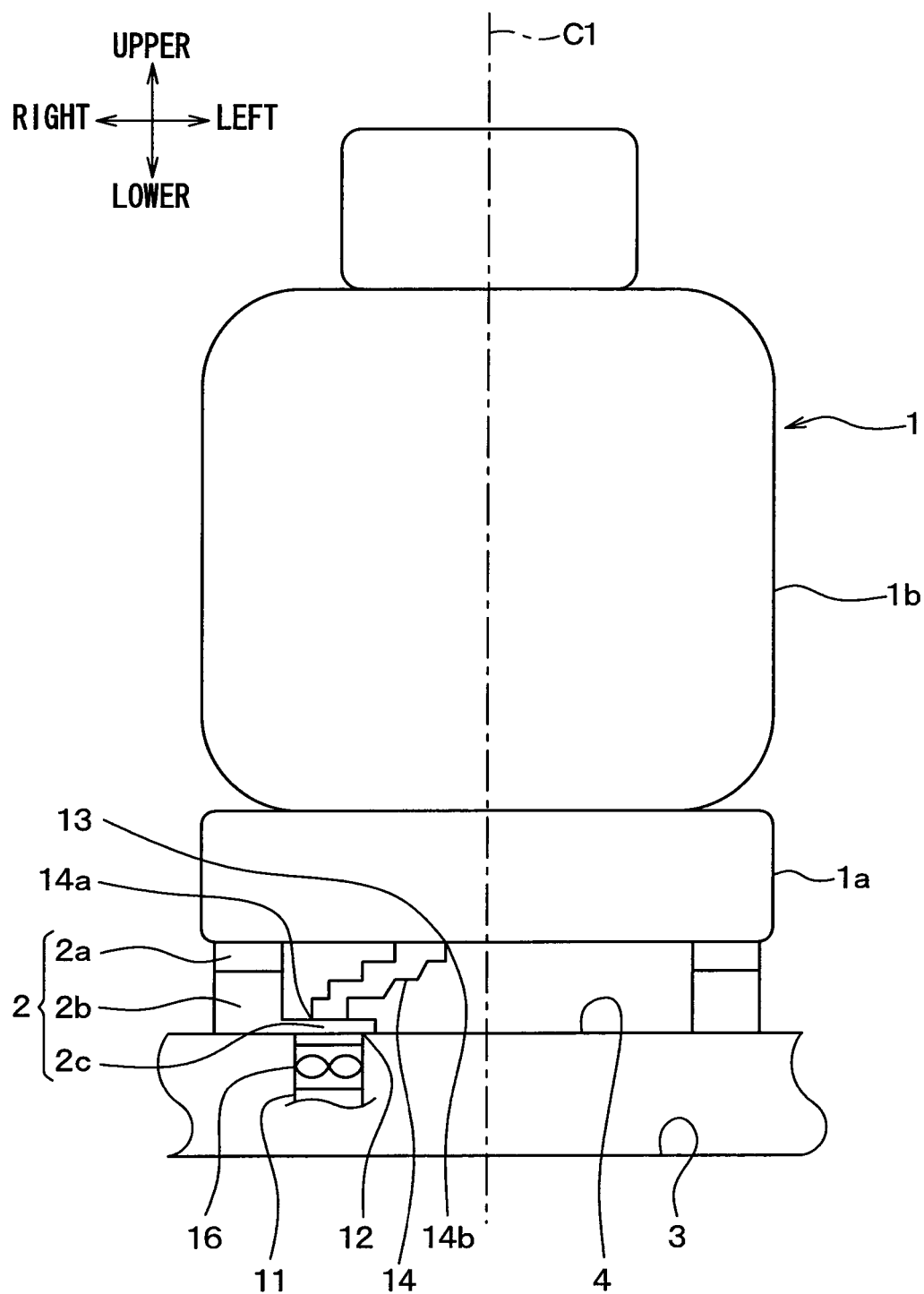
FIG. 3 is a front view illustrating the seat.

As shown in FIG. 3, when viewing the seat 1 from a front side of the vehicle, the floor-side connection part 12 and the seat-side connection part 13 are arranged at different positions in the left-right direction. In other words, when the seat-side connection part 13 is projected to the vehicle-compartment floor 4, the floor-side connection part 12 and the seat-side connection part 13 are arranged not to align with each other in the front-rear direction. Therefore, when the seat 1 is moved in the front-rear direction, the seat-side connection part 13 is not located immediately above the floor-side connection part 12.

Figure 4:
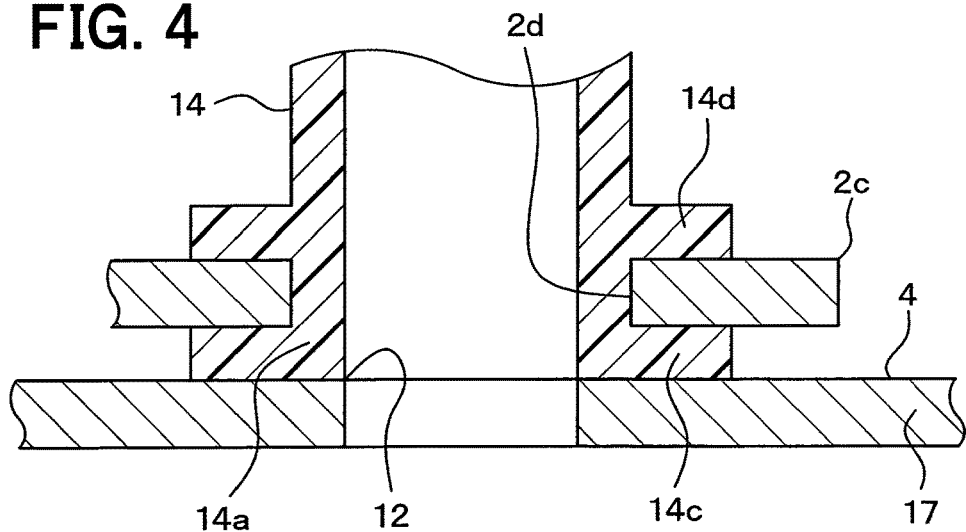
FIG. 4 is a sectional view illustrating a connection state between a connection duct and a floor-side connection part of the first embodiment.

As shown in FIG. 3, the one end portion 14a of the connection duct is fixed to the seat rail 2 such that the one end portion 14a is positioned to face the floor-side connection part 12 when the seat 1 is disposed in the vehicle compartment. Specifically, a bracket 2c having a flat plate shape is disposed in the lower rail 2b. As shown in FIG. 4, the bracket 2c has an opening 2d, and the one end portion 14a of the connection duct 14 fits in the opening 2d. A first and a second flanges 14c, 14d that are arranged on an outer peripheral surface of the one end portion 14a of the connection duct 14 to be distanced from each other. The connection duct 14 is fixed to the bracket 2c by inserting the one end portion 14a of the connection duct 14 to the opening 2d of the bracket 2c and by holding the bracket 2c between the first and second flanges 14c, 14d.

The one end portion 14a of the connection duct 14 and the floor-side connection part 12 are connected to each other on a condition that the seat 1 is disposed in the vehicle compartment. That is, the floor-side connection part 12 is configured by a reinforcing plate, for example, an opening defined in a metal plate 17, reinforcing the vehicle-compartment floor 4. The floor-side connection part 12 is arranged at a position corresponding to the opening 2d of the bracket 2c. A connection part between the connection duct 14 and the floor-side connection part 12 is sealed by pressing the bracket 2c to the vehicle-compartment floor 4 using a self-weight of the seat 1.

The other end portion 14b of the connection duct 14 and the seat-side connection part 13 are connected to each other, for example, by being engaged with each other.

An operation with the above-described configuration will be described. When the air-conditioning device 10 for a vehicle seat and the air conditioner 20 for a vehicle are operated by an operation of the air-conditioning operation panel, an air, which is conditioned by the interior air-conditioning unit 21, flows in the air conditioning duct 11 by an operation of the blower 16. Air flowing in the air conditioning duct 11 flows into the air passage 15 in the bottom part 1a through the connection duct 14 and is blown from a surface of the bottom part 1a to buttocks and femoral areas of the passenger. At this time, a pressure loss of air passing through an inside of the bottom part 1a is higher in the surface portion than in the seat pad. Accordingly, a velocity distribution of air that is blown from the surface of the bottom part can be uniform, and the passenger can keep feeling comfortable.

Main features of the present embodiment will be described.

Figure 5A:
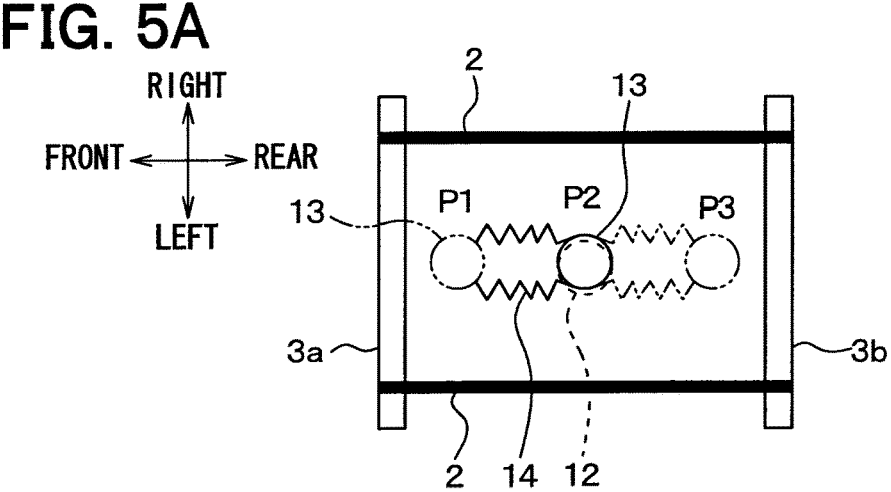
FIG. 5A is a diagram regarding a comparison example and showing a locational relationship among a floor-side connection part and a seat-side connection part when a seat is moved.
Figure 5B:
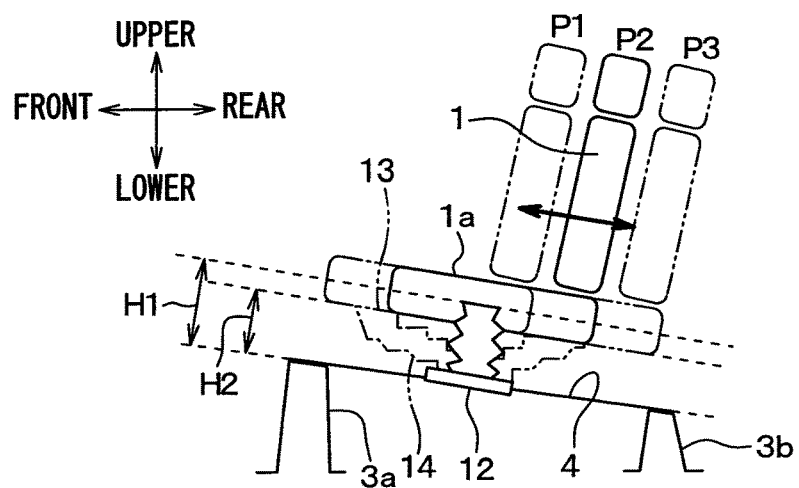
FIG. 5B is a diagram regarding the comparison example and illustrating a connection duct when the seat is moved

FIGS. 5A, 5B show a comparison example 1. In FIG. 5A, positions P1, P2, P3 of the seat-side connection part 13 respectively correspond to positions P1, P2, P3 of the seat 1 in FIG. 5B. The comparison example 1 is different from the present embodiment in a point that the floor-side connection part 12 and the seat-side connection part 13 are arranged to be coincident with each other in the left-right direction.

When the seat-side connection part 13 is located immediately above the floor-side connection part 12, the connection duct 14 makes the seat-side connection part 13 and the floor-side connection part 12 connect to each other straight in the vertical direction. In this case, a height dimension of the connection duct 14 cannot be shorter than a length of the connection duct 14 on a condition of shrinking most. In recent years, a height dimension of the space under the seat 1 tends to be downsized. Accordingly, even when a maximum length of the connection duct 14 is shortened, a shortest length of the connection duct 14 is longer than the height dimension of the space under the seat 1, and thereby there may be a possibility that the connection duct 1 cannot be housed in the limited space under the seat 1.

Specifically, according to the comparison example 1, as shown in FIGS. 5A, 5B, the seat-side connection part 13 is positioned immediately above the floor-side connection part 12 when the seat 1 is located at a position where the floor-side connection part 12 and the seat-side connection part 13 are coincident with each other in the front-rear direction. Accordingly, as shown in FIG. 5B, a height dimension H1 of the connection duct 14 can be kept being smaller than a height dimension H2 of the space under the seat 1 when the seat 1 is located at a position except for the position P2. However, the height dimension H1 of the connection duct 14 cannot be kept being smaller than the height dimension H2 of the space when the seat 1 is located at the position P2. The connection duct 14 in a case where the seat 1 is located at the position P2 in FIG. 5B is shown to overlap with the seat 1.

Figure 6A:
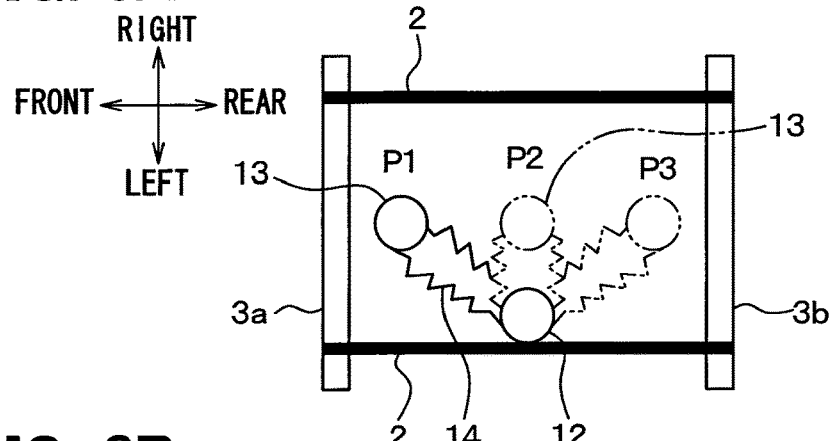
FIG. 6A is a diagram regarding the first embodiment and showing a locational relationship among the floor-side connection part and a seat-side connection part when the seat is moved.
Figure 6B:
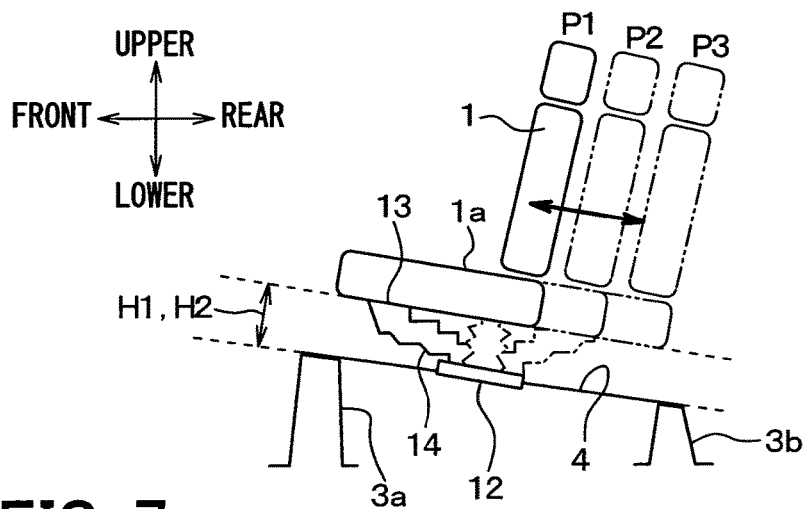
FIG. 6B is a diagram regarding the first embodiment and illustrating the connection duct when the seat is moved.

On the other hand, according to the present embodiment, the floor-side connection part 12 and the seat-side connection part 13 are arranged at different positions in the left-right direction when viewing the seat 1 from the front side of the vehicle. Accordingly, as shown in FIGS. 6A, 6B, the seat-side connection part 13 does not located immediately above the floor-side connection part 12 when the seat 1 is moved in the front-rear direction. That is, the floor-side connection part 12 and the seat-side connection part 13 are arranged to avoid overlapping with each other in the upper-lower direction (i.e., the upper-lower direction of the vehicle) when the seat 1 is moved in the front-rear direction. "The floor-side connection part and the seat-side connection part do not overlap with each other in the upper-lower direction of the vehicle" means that a projection image of the seat-side connection part, which is taken when the seat-side connection part is projected to the vehicle-compartment floor in a direction parallel with the upper-lower direction of the vehicle, does not overlap with the floor-side connection part.

In this case, the connection duct 14 deforms and shrinks on a condition of consistently inclining with respect to the upper-lower direction, in other words, in the vertical direction, regardless of a position of the seat 1 in the front-rear direction. In other words, a length of the connection duct 14 on the condition of shrinking most is generally the same as a direct distance that connects the floor-side connection part 12 and the seat-side connection part 13. Accordingly, the height dimension H1 of the connection duct 14 on a condition of being disposed in the space under the seat 1 can coincide to the height dimension H2 of the space. That is, even when the length of the connection duct 14 on the condition of shrinking most is larger than the height dimension H2 of the space, the height dimension H1 of the connection duct 14 consistently coincides to the height dimension H2 of the space since the connection duct 14 inclines with respect to the vertical direction.

Therefore, according to the present embodiment, the connection duct 14 can be housed in the limited space under the seat 1.

Figure 7:
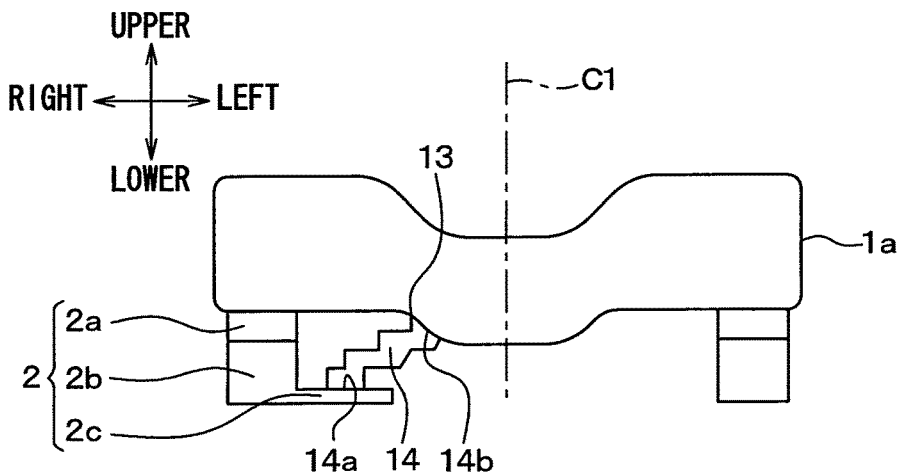
FIG. 7 is a view illustrating a bottom part of the seat when a passenger has the seat.

As shown in FIG. 7, when the passenger has the seat, mainly a center of the bottom part 1a sags downward, and the space under the seat 1 becomes narrow. Accordingly, in a case where at least one of the one end portion 14a and the other end portion 14b of the connection duct 14 is located on a center line C1 of the seat 1 in the left-right direction, the connection duct 14 is collapsed when the passenger has the seat. Further, in a case where the one end portion 14a and the other end portion 14b are arranged to have the center line C1 therebetween in the left-right direction, the connection duct 14 is collapsed when the passenger has the seat.

In contrast, according to the present embodiment, both the one end portion 14a and the other end portion 14b of the connection duct 14 are arranged to be distanced from the center line C1 toward one of the seat rails 2. Therefore, the connection duct 14 can be prevented from being collapsed by being pressed between the seat 1 and the vehicle-compartment floor 4 when the passenger has the seat. Particularly, according to the present embodiment, since the one end portion 14a of the connection duct 14 is located close to the seat rail 2 having a high rigidity, the space for the connection duct 14 on a condition where the passenger has the seat can be secured.

According to the present embodiment, as described above, the one end portion 14a of the connection duct 14 is fixed to the bracket 2c. By pressing the bracket 2c to the vehicle-compartment floor 4, the one end portion 14a of the connection duct 14 connects to the floor-side connection part 12.

Therefore, according to the present embodiment, the connection duct 14 can be connected to the floor-side connection part 12 by assembling, in advance, the connection duct 14 with the seat 1, which is in a state where the seat rail 2 is attached thereto, and by disposing the seat 1 in the vehicle compartment subsequently. Thus, according to the present embodiment, connection works such as a positioning of the floor-side connection part 12 with respect to the connection duct 14 and a fitting of the floor-side connection part 12 to the connection duct 14 are unnecessary.

Second Embodiment

The present embodiment is modified with respect to the first embodiment to change a connectional structure among the one end portion 14a of the connection duct 14 and the floor-side connection part 12.

Figure 8:
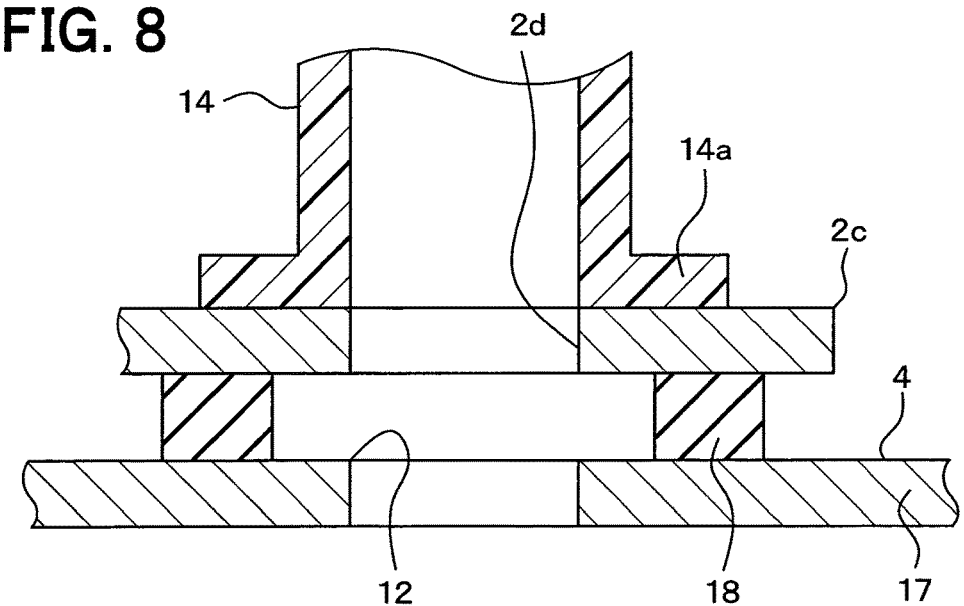
FIG. 8 is a sectional view regarding a second embodiment and illustrating a connection state of a connection duct and a floor-side connection part.

According to the present embodiment, as shown in FIG. 8, the one end portion 14a of the connection duct 14 is fixed to the bracket 2c by a joining work such as a welding. A sealing part 18 is disposed on a surface of the bracket 2c adjacent to the vehicle-compartment floor 4 to surround a periphery of the opening 2d. A connection part between the connection duct 14 and the floor-side connection part 12 is sealed by pressing the bracket 2c to the vehicle-compartment floor 4 using a self-weight of the seat 1.

Third Embodiment

The present embodiment is modified with respect to the first embodiment to change an arrangement of the floor-side connection part 12 and the seat-side connection part 13.

Figure 9A:
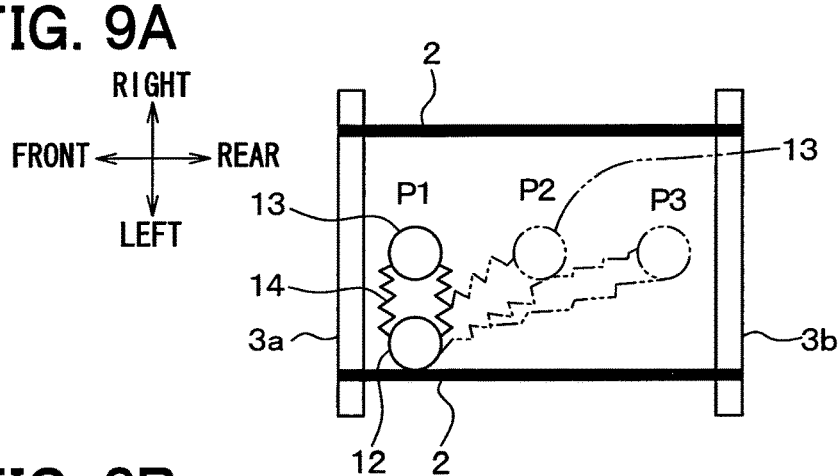
FIG. 9A is a diagram regarding a third embodiment and showing a locational relationship among the floor-side connection part and a seat-side connection part when a seat is moved.
Figure 9B:
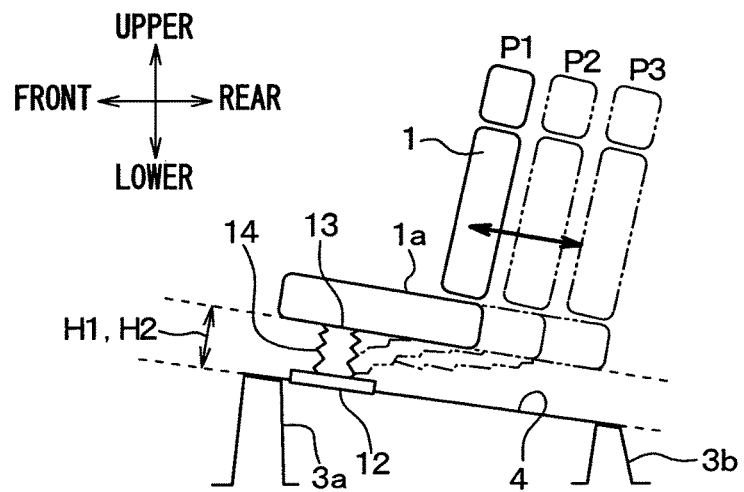
FIG. 9B is a diagram regarding the third embodiment and illustrating a connection duct when the seat is moved.

According to the present embodiment, as shown in FIGS. 9A and 9B, the floor-side connection part 12 and the seat-side connection part 13 are arranged such that the floor-side connection part 12 and the seat-side connection part 13 are coincident with each other in the front-rear direction when the seat 1 is located at the foremost position P1 in a range in which a position of the seat 1 is adjustable. A feature that the floor-side connection part 12 and the seat-side connection part 13 are coincident with each other in the front-rear direction includes a condition where at least a part of the floor-side connection part 12 and at least a part of the seat-side connection part 13 are coincident with each other. That is, a condition where at least a part of the floor-side connection part 12 and at least a part of the seat-side connection part 13 overlap with each other in the left-right direction is included.

Similar to the first embodiment, the floor-side connection part 12 and the seat-side connection part 13 are located at different positions in the left-right direction as shown in FIG. 9A. Accordingly, the present disclosure provides the same effect as the first embodiment.

According to the present embodiment, the floor-side connection part 12 and the seat-side connection part 13 are arranged to be coincident with each other in the front-rear direction when the seat 1 is located at the foremost position P1. However, the floor-side connection part 12 and the seat-side connection part 13 are arranged to be coincident with each other in the front-rear direction when the seat 1 is located at the rearmost position P3.

Fourth Embodiment

The present embodiment is modified with respect to the first embodiment to change an arrangement of the floor-side connection part 12 and the seat-side connection part 13.

Figure 10A:
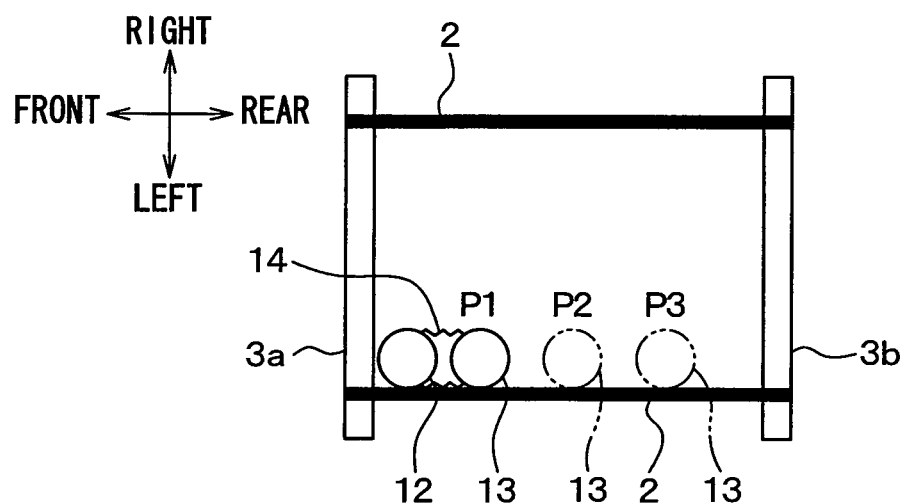
FIG. 10A is a diagram regarding a fourth embodiment and showing a locational relationship among a floor-side connection part and a seat-side connection part when a seat is moved.
Figure 10B:
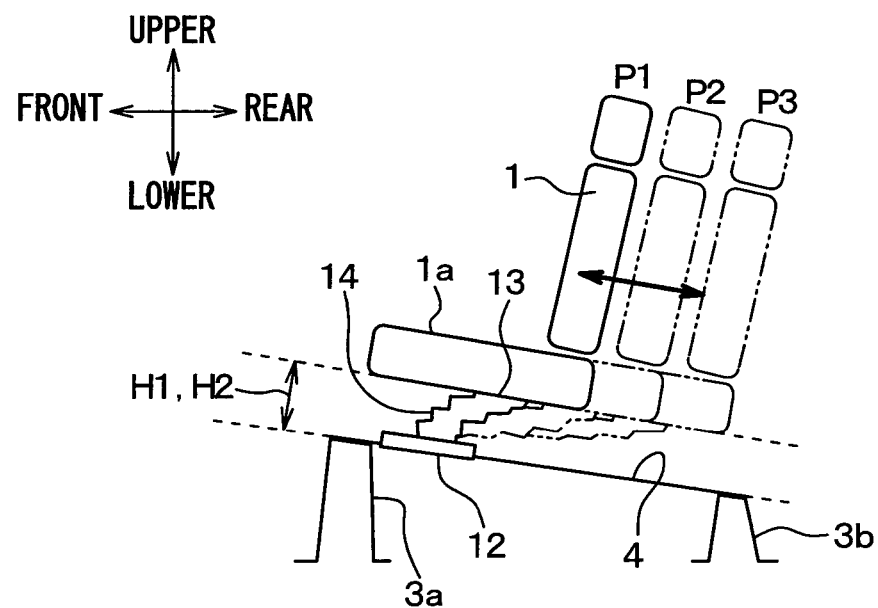
FIG. 10B is a diagram regarding the fourth embodiment and illustrating a connection duct when the seat is moved.

According to the present embodiment, as shown in FIGS. 10A, 10B, the floor-side connection part 12 and the seat-side connection part 13 are arranged such that the seat-side connection part 13 is located on a rear side of the seat-side connection part 12 in the front-rear direction of the vehicle when the seat 1 is located at the foremost position P1 in the front-rear direction. In FIG. 10A, an illustrating of the connection duct 14 when the seat 1 is located at the positions P2, P3 is omitted.

According to the present embodiment, the floor-side connection part 12 is arranged in the vehicle-compartment floor 4 on a side adjacent to the front cross 3a in an area between the front cross 3a and the rear cross 3b. Moreover, as shown in FIG. 10A, the floor-side connection part 12 and the seat-side connection part 13 are arranged to align with each other in the front-rear direction.

Since the floor-side connection part 12 and the seat-side connection part 13 are arranged as described above, the seat-side connection part 13 is consistently located on the rear side of the floor-side connection part 12 in the front-rear direction when the seat 1 is moved from the foremost position P1 to a rear side in the front-rear direction. That is, according to the present embodiment, the floor-side connection part 12 and the seat-side connection part 13 are arranged to avoid overlapping with each other in the upper-lower direction of the vehicle when the seat 1 is moved in the front-rear direction.

Therefore, according to the present embodiment, the seat-side connection part 13 is not located immediately above the floor-side connection part 12 when the seat 1 is moved in the front-rear direction. Accordingly, the present disclosure provides the same effect as the first embodiment.

According to the present embodiment, the floor-side connection part 12 and the seat-side connection part 13 are arranged to align with each other in the front-rear direction. However, the floor-side connection part 12 and the seat-side connection part 13 may be arranged not to align with each other in the left-right direction.

Fifth Embodiment

Figure 11A:
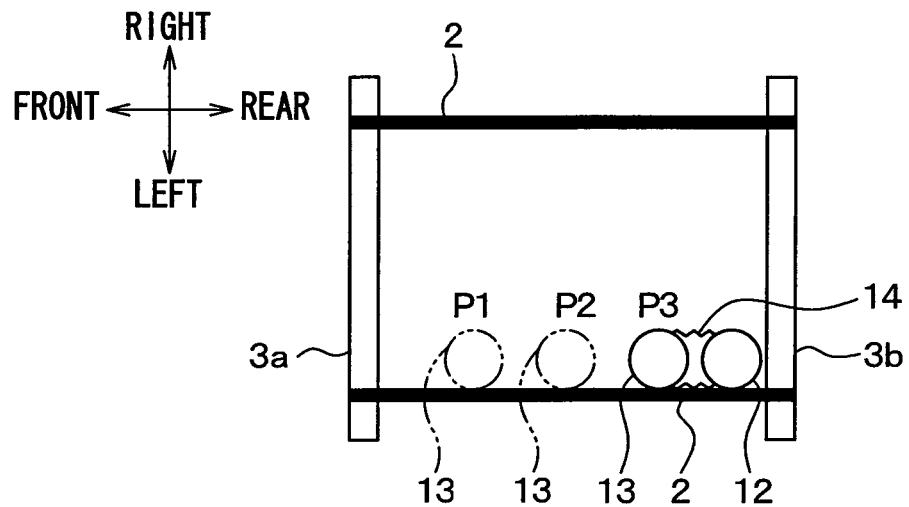
FIG. 11A is a diagram regarding a fifth embodiment and showing a locational relationship among a floor-side connection part and a seat-side connection part when a seat is moved.
Figure 11B:
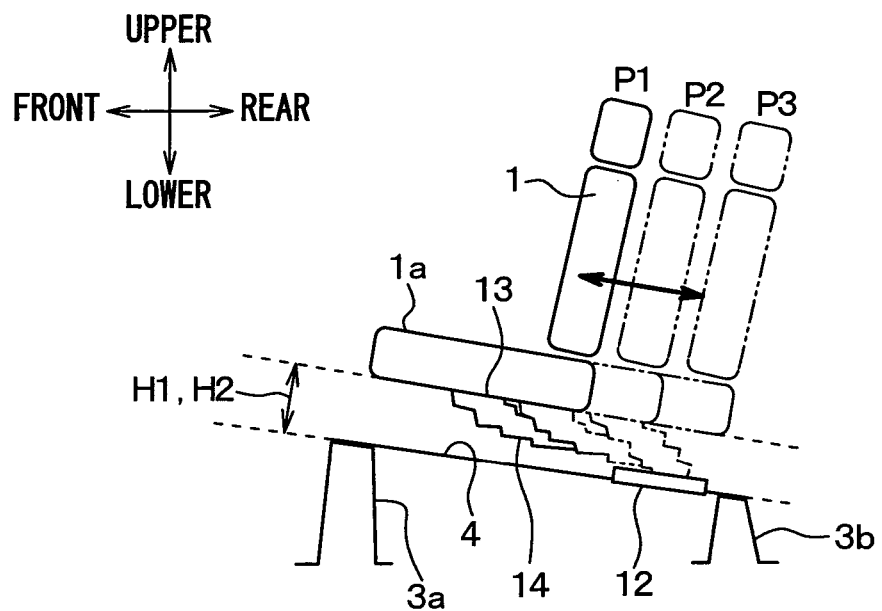
FIG. 11B is a diagram regarding the fifth embodiment and illustrating a connection duct when the seat is moved.

The present embodiment is modified with respect to the fourth embodiment to change a position of the floor-side connection part 12 toward a side of the rear cross 3b as shown in FIGS. 11A, 11B. In FIG. 11A, an illustration of the connection duct 14 when the seat 1 is located at the positions P2, P3 is omitted.

According to the present embodiment, the floor-side connection part 12 and the seat-side connection part 13 are arranged such that the seat-side connection part 13 is located on a front side of the floor-side connection part 12 in the front-rear direction when the seat 1 is located at the rearmost position P3.

Since the floor-side connection part 12 and the seat-side connection part 13 are arranged as described above, the seat-side connection part 13 is consistently located on the front side of the floor-side connection part 12 in the front-rear direction when the seat 1 is moved from the rearmost position P3 to a front side in the front-rear direction. That is, according to the present embodiment, the floor-side connection part 12 and the seat-side connection part 13 are arranged to avoid overlapping with each other in the upper-lower direction of the vehicle when the seat 1 is moved in the front-rear direction.

Accordingly, the present disclosure provides the same effect as the fourth embodiment. Similar to the fourth embodiment, the floor-side connection part 12 and the seat-side connection part 13 may be arranged not to align with each other in the left-right direction.

Other Modification

It should be understood that the present disclosure is not limited to the above-described embodiments and intended to cover various modification within a scope of the present disclosure as described hereafter.

(1) The connection duct 14 fits in the opening 2d of the bracket 2c according to the first embodiment, and the connection duct 14 is joined to the bracket 2c according to the second embodiment. However, an aspect regarding fixing the connection duct 14 to the bracket 2c is not limited thereto. A state in which the connection duct 14 is fixed to the bracket 2c is not limited to a state in which the connection duct 14 is completely constrained by the bracket 2c. The connection duct 14 may be supported movable freely by the bracket 2c as long as the connection duct 14 and the floor-side connection part 12 are connected to each other only by disposing the seat 1 to the vehicle-compartment floor 4.

(2) According to the above-described embodiments, the connection duct 14 is formed in the bellows shape. However, the connection duct 14 is not limited to have the bellows shape as long as being deformable and stretchable. For example, the connection duct 14 may be made of a material such as rubber that is stretchable.

(3) According to the above-described embodiments, the seat-side connection part 13, that is, the other end portion 14b of the connection duct 14 is arranged to be distanced from the center line C1. However, the other end portion 14b may be arranged on the center line C1 as long as the bottom part 1a has a structure with which the center portion of the bottom part 1a does not sag downward. Similarly, the one end portion 14a and the other end portion 14b of the connection duct 14 may be arranged to have the center line C1 therebetween in the left-right direction as long as having a structure with which the center portion of the bottom part 1a does not sag downward.

(4) According to the above-described embodiments, the one end portion 14a of the connection duct 14 is fixed to the seat rail 2. However, the one end portion 14a may not be fixed to the seat rail 2. In this case, connection works such as a positioning of the floor-side connection part 12 with respect to the connection duct 14 and a fitting of the floor-side connection part 12 to the connection duct 14 are necessary.

(5) According to the above-described embodiments, the blower 16 is arranged below the vehicle-compartment floor 4. However, an arrangement location of the blower 16 may be changed as required. For example, the blower 16 may be arranged inside of the seat 1.

(6) According to the above-described embodiments, the floor-side connection part 12 is disposed to be flush with the vehicle-compartment floor 4. However, the floor-side connection part 12 is disposed above or below the vehicle-compartment floor 4. Further, the vehicle-body floor 3 may configure a vehicle-compartment floor that partitions the interior space of the vehicle compartment.

(7) Each above-described embodiment is not mutually unrelated, and the above-described embodiments can be combined except for a case of being clearly improper. In the above-described embodiments, it is to be understood that elements constituting the embodiments are not necessary except for a case of being explicitly specified to be necessary and a case of being considered to be absolutely necessary in principle.

What is claimed is:

1. An air-conditioning device for a vehicle seat comprising:
   a seat in which an air passage is formed, the seat of which position is adjustable in a front-rear direction of a vehicle;
   an air conditioning duct connected to an interior air-conditioning unit that air-conditions an interior space of a vehicle compartment, the air conditioning duct guides air, which is supplied from the interior air-conditioning unit, to a lower side of the seat;
   a floor-side connection part that is provided in a vehicle-compartment floor on the lower side of the seat and connects to a downstream side of the air conditioning duct in an air flow direction;
   a seat-side connection part that is provided in a seat bottom surface of the seat and connects to the air passage; and
   a connection duct that guides air flowing in the air conditioning duct to the air passage through both the floor-side connection part and the seat-side connection part, wherein
   the connection duct is deformable, stretchable and comprised of a singular bellow,
   the floor-side connection part and the seat-side connection part are arranged to avoid overlapping with each other in an upper-lower direction of the vehicle when the seat is moved in the front-rear direction,
   the seat is provided with two seat rails adjusting a position of the seat in the front-rear direction of the vehicle, and the two seat rails are respectively provided in both end portions of the seat bottom surface in a left-right direction of the vehicle,
   the connection duct includes one end portion connecting to the floor-side connection part and an other end portion connecting to the seat-side connection part, both the one end portion and the other end portion are arranged on a side that is adjacent to one seat rail of the two seat rails,
   the two seat rails are fixed to a fixed member provided on a vehicle-body side,
   the one end portion of the connection duct is fixed to a bracket, which is provided with the one seat rail and is in contact with the vehicle-compartment floor,
   the connection duct and the floor-side connection part are connected to each other by pressing the bracket to the vehicle-compartment floor when the two seat rails are fixed to the fixed member,
   the connection duct has a first flange that extends outward from the one end portion of the connection duct, and a second flange that extends outward, the second flange being spaced from the first flange in a direction in which the connection duct extends,
   the bracket is wedged between the first flange and the second flange, and
   the bracket is in contact with the vehicle-compartment floor through the first flange.

2. The air-conditioning device for a vehicle seat according to claim 1, wherein
   the floor-side connection part and the seat-side connection part are arranged at different positions in a left-right direction of the vehicle.

3. The air-conditioning device for a vehicle seat according to claim 2, wherein
   the floor-side connection part and the seat-side connection part are arranged to be coincident with each other in the left-right direction of the vehicle when the seat is located at a specified position in a range in which a position of the seat is adjustable in the front-rear direction of the vehicle.

4. The air-conditioning device for a vehicle seat according to claim 3, wherein
   the floor-side connection part and the seat-side connection part are arranged such that the seat-side connection part transfers across the floor-side connection part in the front-rear direction of the vehicle when the seat is moved in the front-rear direction of the vehicle.

5. The air-conditioning device for a vehicle seat according to claim 1, wherein
   the floor-side connection part and the seat-side connection part are arranged such that the seat-side connection part is located on a rear side of the floor-side connection part in the front-rear direction of the vehicle when the seat is located at a foremost position in a range in which a position of the seat is adjustable in the front-rear direction of the vehicle.

6. The air-conditioning device for a vehicle seat according to claim 1, wherein
   the floor-side connection part and the seat-side connection part are arranged such that the seat-side connection part is located on a front side of the floor-side connection part in the front-rear direction of the vehicle when the seat is located at a rearmost position in a range in which a position of the seat is adjustable in the front-rear direction of the vehicle.

7. The air-conditioning device for a vehicle seat according to claim 1, further comprising
   a blower that is arranged below the vehicle-compartment floor and causes an air flow, wherein
   the air conditioning duct has a downstream end portion that connects to the floor-side connection part through the blower.

8. The air-conditioning device for a vehicle seat according to claim 1, wherein
   the connection duct is comprised entirely of the singular bellow.

9. The air-conditioning device for a vehicle seat according to claim 1, wherein
   the connection duct is continuously inclined with respect to the upper-lower direction of the vehicle such that a length of the connection duct is reduced.

10. The air-conditioning device for a vehicle seat according to claim 1, wherein
    the floor-side connection part and the seat-side connection part are arranged in different latitudinal planes extending in the front-rear direction of the vehicle.

11. The air-conditioning device for a vehicle seat according to claim 1, wherein
    the floor-side connection part is statically located in the vehicle compartment floor directly adjacent to a lower left side of the seat throughout an entire range of movement of the seat in the front-rear direction while the seat-side connection part is centrally located with respect to a left-right direction of the vehicle in the seat bottom surface of the seat throughout the entire range of movement of the seat in the front-rear direction.

12. The air-conditioning device for a vehicle seat according to claim 1, wherein
the floor side connection part is statically located in the vehicle compartment floor directly adjacent to a front, left side of the seat throughout an entire range of movement of the seat in the front-rear direction while the seat-side connection part is centrally located with respect to a left-right direction of the vehicle in the seat bottom surface of the seat throughout the entire range of movement of the seat in the front-rear direction.

13. The air-conditioning device for a vehicle seat according to claim 1, wherein
the bracket extends along the vehicle-compartment floor.

14. The air-conditioning device for a vehicle seat according to claim 1, wherein
a downstream end of the air conditioning duct is located on the vehicle-compartment floor.

* * * * *